United States Patent [19]

Maruyama et al.

[11] Patent Number: 4,959,521

[45] Date of Patent: Sep. 25, 1990

[54] METHOD AND APPARATUS FOR FASTENING PARTS SECURELY IN PLACE USING A BAND

[75] Inventors: Iwao Maruyama; Kimitake Uzuyama, both of Sayama, Japan

[73] Assignee: Honda Giken Kogyo Kabushiki Kaisha, Tokyo, Japan

[21] Appl. No.: 401,253

[22] Filed: Aug. 31, 1989

[30] Foreign Application Priority Data

Sep. 8, 1988 [JP] Japan ................................ 63-223443
Sep. 8, 1988 [JP] Japan ................................ 63-223444

[51] Int. Cl.$^5$ ............................................ B23K 26/00
[52] U.S. Cl. ........................... 219/121.63; 219/121.77; 219/121.82
[58] Field of Search ....................... 219/121.63, 121.64, 219/121.6, 121.85, 121.76, 121.77, 121.82

[56] References Cited

U.S. PATENT DOCUMENTS

| | | | |
|---|---|---|---|
| 4,200,966 | 5/1980 | Nakao et al. | 29/243.5 |
| 4,701,591 | 10/1987 | Masaki et al. | 219/121.77 |
| 4,873,417 | 10/1989 | Moriyasu et al. | 219/121.63 X |

FOREIGN PATENT DOCUMENTS

Sho 63-20514 6/1988 Japan .

*Primary Examiner*—C. L. Albritton
*Attorney, Agent, or Firm*—Armstrong, Nikaido, Marmelstein, Kubovcik & Murray

[57] ABSTRACT

An apparatus for fastening parts securely in place by a band having a band winding device for winding a band around each of tight-binding portions of plurality of parts fitted over an article to which the parts are to be fastened and a laser beam irradiation head applying a laser beam to the overlapped portion of both ends of the band, the apparatus comprising a plurality of working stations to which the article is conveyed successively, means for successively conveying the article through the plurality of working stations, a band winding device provided at each of the working stations, the band winding device being applicable to the corresponding predetermined tight-binding portions of the parts, a laser beam irradiation head provided for each of two groups of the band winding devices disposed in the plurality of working stations, one of which groups comprises those disposed in front along the conveying direction in which the article is conveyed and the other of which groups comprises those in the rear, each laser beam irradiation head being movable successively to positions at which it is aligned with each of the band winding devices belonging to the corresponding group, a common laser generator for generation of laser beam, and shift means for selectively leading the laser beam into each of the laser beam irradiation heads.

6 Claims, 15 Drawing Sheets

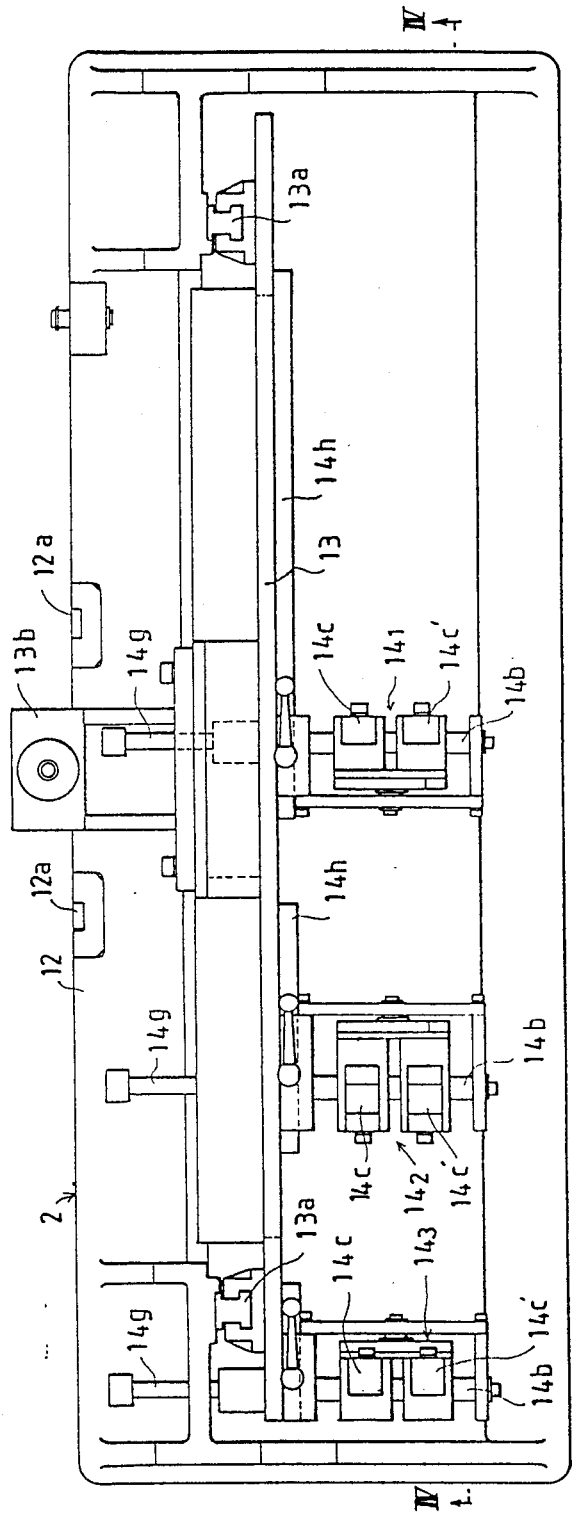

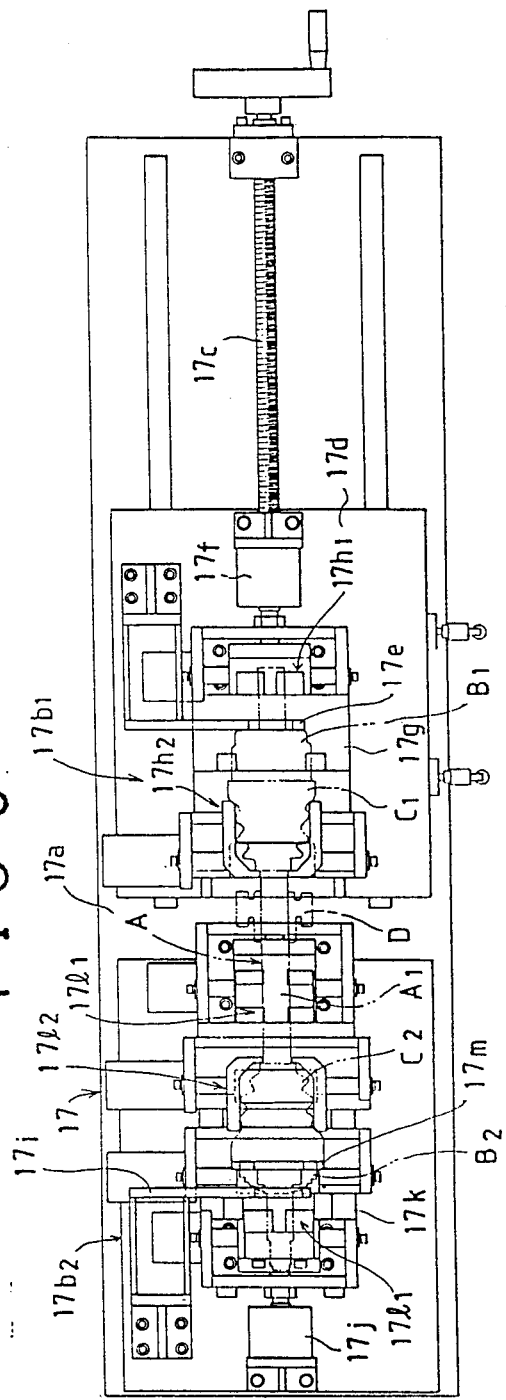

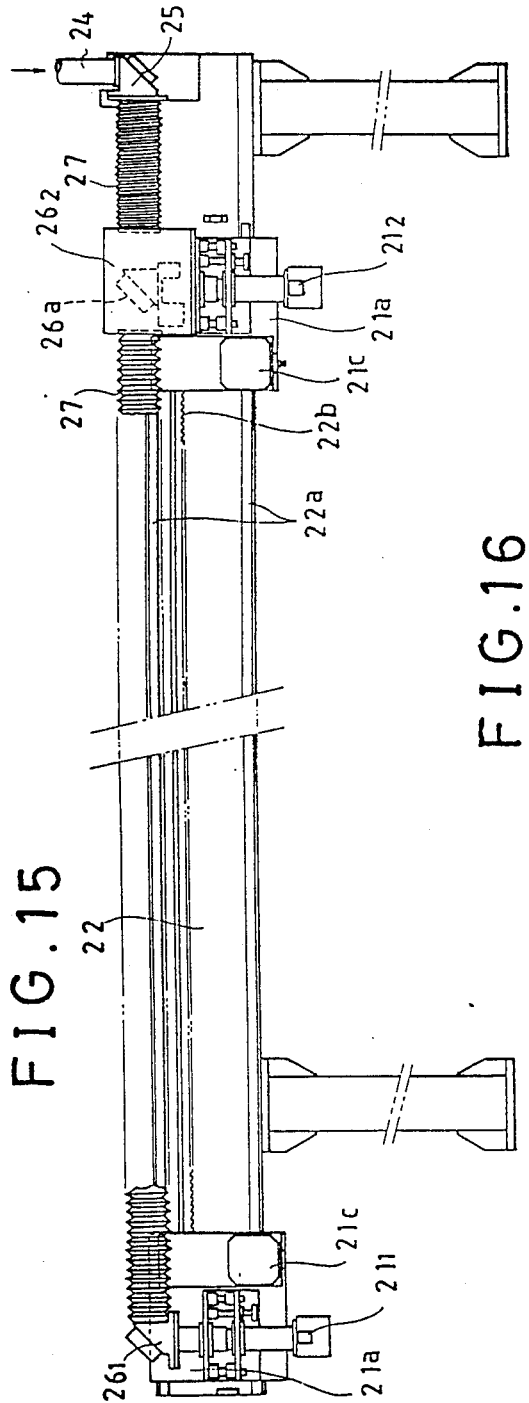
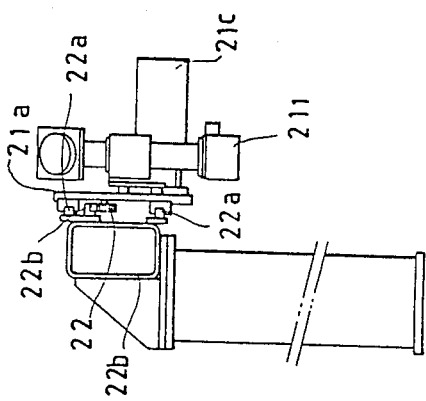

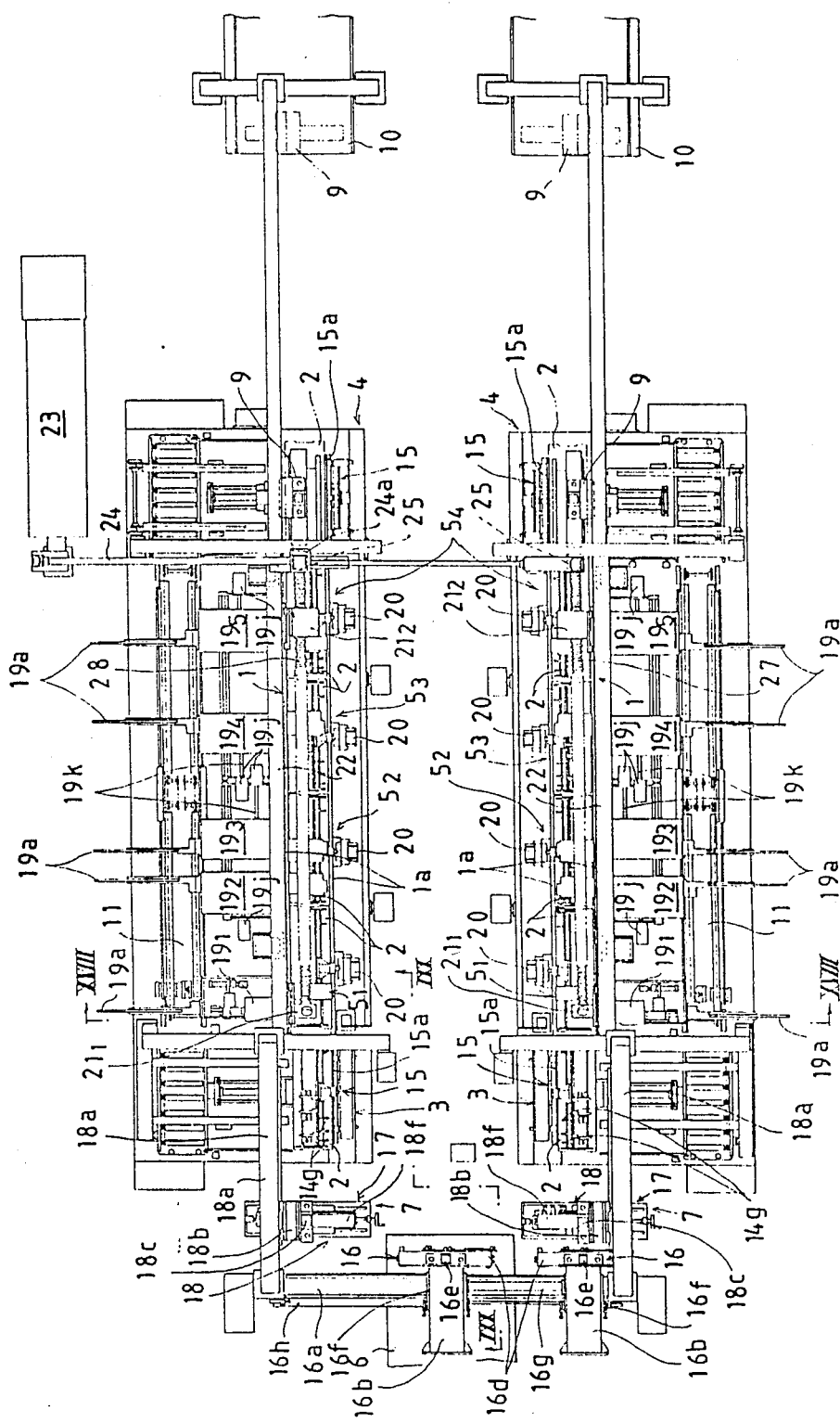

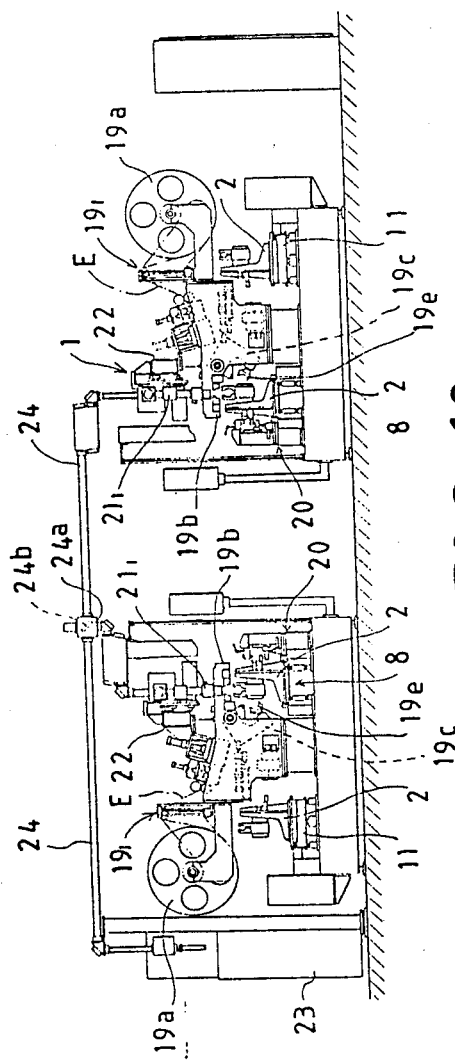
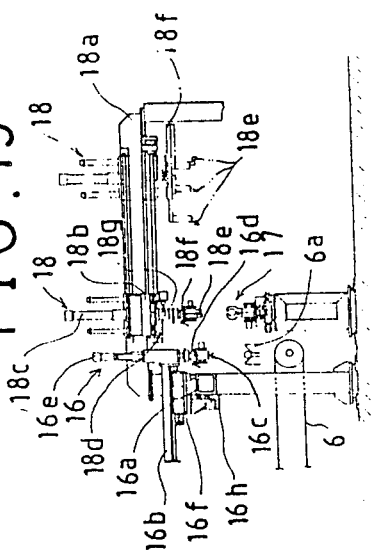
FIG. 18
FIG. 19

METHOD AND APPARATUS FOR FASTENING PARTS SECURELY IN PLACE USING A BAND

BACKGROUND OF THE INVENTION

This invention relates to a method of and an apparatus for fastening parts in place wherein an article to which a part or component is to be fastened securely consists primarily of a vehicular-use driving shaft. Parts such as boots which are fitted over each of both ends of the shaft in such a manner as to cover open ends of constant velocity joints attached thereto and are fastened securely in place by means of a band.

Japanese Examiner Patent Application Publication No. Tokkosho No. 58-34710 and the Japanese Unexamined Utility Model Registration Application Publication No. Jikkaisho No. 58-146630 disclose a method and apparatus of this kind in which, after winding a band onto each end of a boot by a band winding device, a laser beam emitted from a laser beam irradiation head is applied to the overlapped portion comprising both ends of the band to weld them together so as to securely fasten the boot in place.

Generally, for fitting a boot over the driving shaft, the diametrically larger end thereof has to be securely fastened to the constant velocity joint attached to the shaft and the diametrically smaller end thereof to the shaft body. Conventionally, this is done in such a manner that a worker manually adjusts the position of the driving shaft set in the band winding device and then the diametrically larger and smaller ends of each of the boots fitted over each of both ends of the shaft are securely fastened in place successively.

When the operation to fasten the boots securely in place is performed while adjusting position of the driving shaft as described in the foregoing, there naturally arises the problem of poor work efficiency. To improve the work efficiency for higher productivity, it is desired that the driving shaft is conveyed successively to a plurality of working stations, each of which is equipped with a band winding device, so that the boot-fastening operation can be carried out in a flow process.

It should also be noted that a laser generator is considerably expensive and, therefore, even when each of the band winding devices may be equipped individually with a laser beam irradiation head, a common laser generator is used for all and a laser beam therefrom has to be led successively into each of the irradiation heads by a shift means, so that it is not possible to perform welding of the band simultaneously at a plurality of the working stations.

In view of the foregoing, the present invention has for its object to provide a method of and apparatus for fastening parts securely in place wherein each of the parts is fastened in place in a flow process and only one common laser generator is used with fewer units of laser beam irradiation head for reduction in equipment cost while maintaining approximately the same work efficiency obtainable when every band winding device is equipped with a laser beam irradiation head.

SUMMARY OF THE INVENTION

To achieve the above object, the present invention provides a method of fastening parts securely in place comprising winding a band around each of tight-binding portions of a plurality of parts fitted over an article to which the parts are to be fastened using a band winding device and applying a laser beam emitted from a laser beam irradiation head to the overlapped portion of both ends of the band for welding thereof. The method further comprises the steps of: conveying the article successively to a plurality of working stations, each equipped with a band winding device, and performing band-winding at each of the working stations for each of the predetermined tight-binding portions of the parts; and dividing a plurality of the band winding devices disposed at these working stations into at least two groups, one comprising those in front along the conveying direction in which the article is conveyed and the other comprising those in the rear, and moving a laser beam irradiation head, which is one of the irradiation heads provided one per group of the band winding devices, successively to a position at which it is aligned with each of the band winding devices belonging to the corresponding group so as to be prepared for welding of the band, wherein movement of one of the laser beam irradiation heads is alternated with that of the other and, while that one laser beam irradiation head is being moved, a laser beam emitted from a common laser generator is led into the other laser beam irradiation head to carry out the welding.

More specifically, each of a plurality of the band winding devices belonging to each group is assigned a number in sequential order. Before the step of band winding at each of the working stations is completed, each appropriate one of the laser beam irradiation heads is moved to a position at which it is aligned with No. 1 band winding device belonging to the corresponding group. After the step of band winding is completed, a laser beam emitted from the laser generator is led into one of the laser beam irradiation heads so as to weld the band wound up by the No. 1 band winding device, with which said one laser beam irradiation head has been aligned, of that one group. Next, the head is moved to a position at which it is aligned with No. 2 winding device of that one group while the laser beam is led into the other laser beam irradiation head so as to weld the band wound up by No. 1 band winding device of the other group, the No. 1 band winding device being the band winding device with which that other laser beam irradiation head has been aligned.

Thereafter, that other laser beam irradiation head is moved to a position at which it is aligned with No. 2 band winding device of that other group while the laser beam is led into that one laser beam irradiation head which has been moved to the position at which it is aligned with No. 2 band winding device of that one group so as to weld the band wound up by means of that band winding device. The foregoing operation is repeated to carry out the step of band welding at each of all the working stations. Thereafter, the article remaining in each of the working stations is conveyed to the next working station, where the steps of band winding and welding are carried out in the same order and manner as in the foregoing.

As described in the foregoing, when one laser beam irradiation head is being moved, the band welding operation is performed by the other laser beam irradiation head, so that time loss resulting from shifting of these heads can be reduced to a minimum and the operation to fasten parts in place can be carried out with a better efficiency.

According to the other features of the present invention, there may be provided two working lines disposed in parallel to each other, each comprising a plurality of the working stations as above, wherein a laser beam emitted from a common laser generator is selectively supplied to a laser beam irradiation head for each working line and the article to which parts are to be fastened securely in place is conveyed alternately to each of the two working lines, so that when the preparatory process including the step of band winding is being performed on one working line, the step of the welding operation is carried out on the other working line.

More specifically, while the preparatory process including the step of conveying the article from one to the other of the working stations and another step thereafter of winding the band at each of the working stations is being performed at one of the working lines, the laser beam emitted from the laser generator is supplied to the other of the working lines and, using the laser beam irradiation head provided in that working line, the band welding operation is performed at a plurality of the working stations of the working line in sequential order. In this case, it is preferable that a plurality of the band winding devices provided in each of the working lines are divided into at least two groups, each group being provided with one unit of the laser beam irradiation head so as to carry out the step of welding at each of the working lines in the same order and manner as in the foregoing.

When the preparatory process is being performed at said other working line following completion of the afore-said welding operation, the laser beam emitted from the laser generator is supplied to the one working line in which the preparatory process has been completed, thereby carrying out the step of band welding operation at the one working line. The foregoing steps are repeated to perform the parts-fastening operation alternately and continuously with the two working lines.

BRIEF DESCRIPTION OF THE DRAWINGS

The above and other objects and the attendant advantages of the present invention will become readily apparent by reference to the following detailed description where considered in conjunction with the accompanying drawings wherein:

FIG. 3 is a top plan view of a conveying jig for conveying a driving shaft;

FIG. 8 is a top plan view of a position alignment device provided in the carry-in device;

FIG. 15 is a side view of a portion where laser beam irradiation heads are disposed, as seen from the line XV—XV in FIG. 2; FIG. 16 is a left side view of that shown in FIG. 15;

FIG. 17 is a top plan view of another embodiment in which there are two working lines;

FIG. 18 is a front view thereof as seen from the line XVIII—XVIII in FIG. 17;

FIG. 19 is a side view of the carry-in device as seen from the line IXX—IXX in FIG. 18.

DETAILED DESCRIPTION OF PREFERRED EMBODIMENTS

Figure 20:
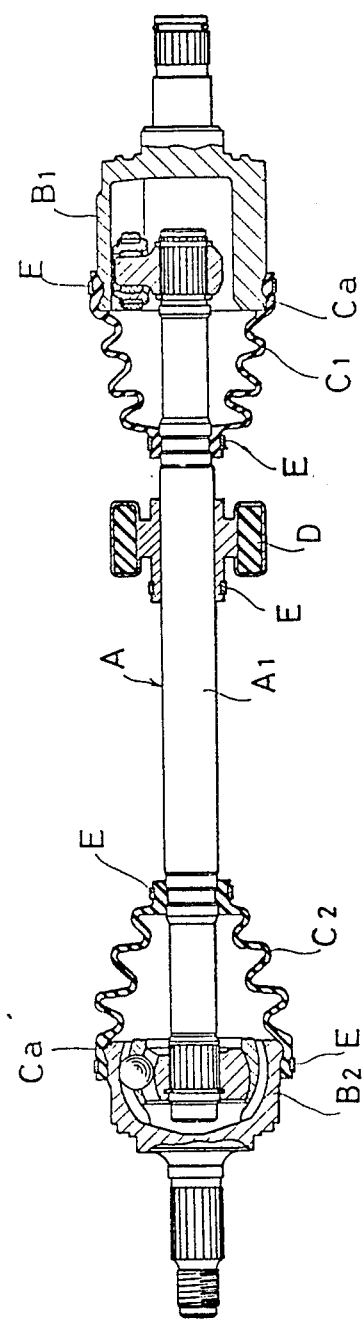
FIG. 20 is a longitudinal sectional view of a driving shaft which is the article to be assembled.

As shown in FIG. 20, the illustrated example is one in which a boot C1 is fitted over the first joint B1 comprising a tripod type constant velocity joint attached to one end of the driving shaft A and another boot C2 is fitted over the second joint B2 comprising a bell type constant velocity joint attached to the other end of the driving shaft A. The diametrically larger end of each boot is fastened securely to the joint B1 or B2. The diametrically smaller end thereof is fastened to the shaft body A1. In addition, a damper weight D is fitted onto the shaft body A1, all fastened by a steel band wound tightly therearound.

Figure 1:
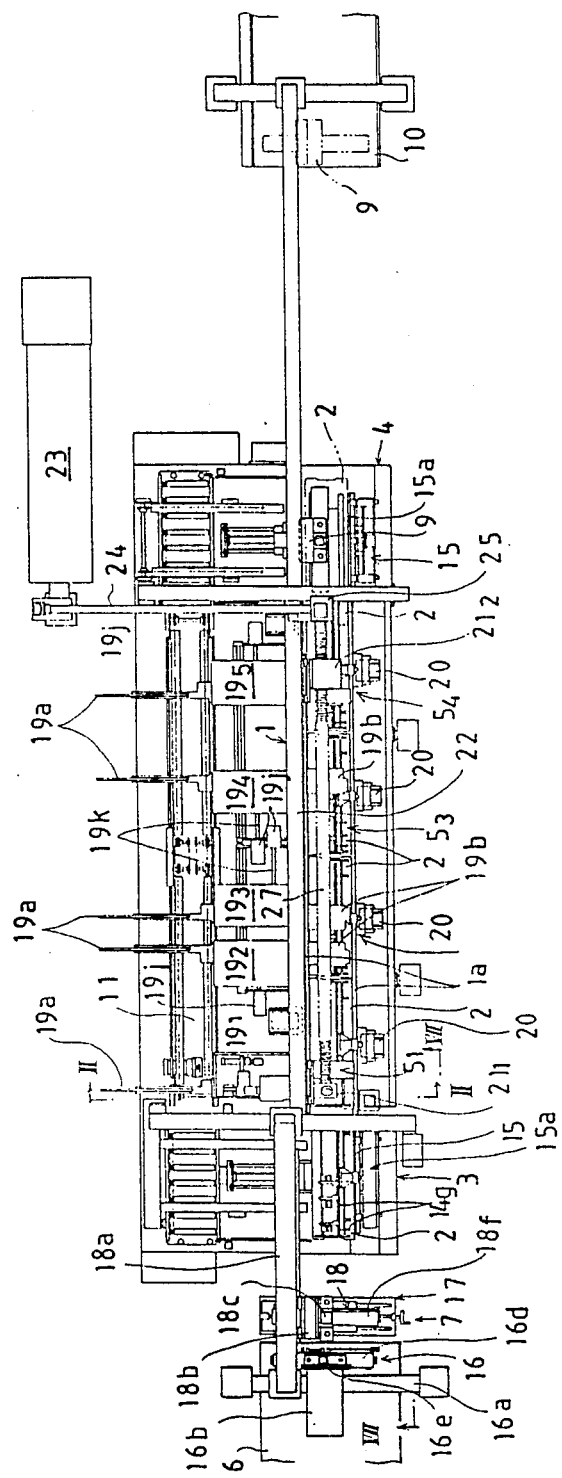
FIG. 1 is a top plan view of an embodiment of the present invention.
Figure 2:
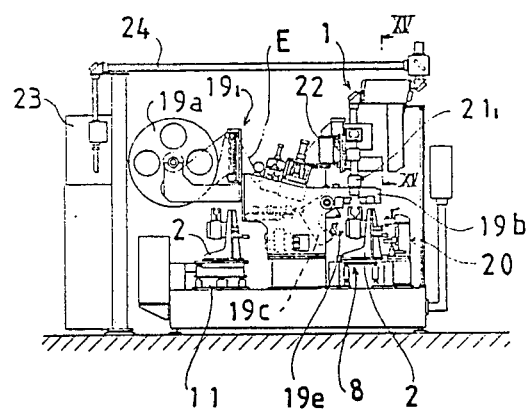
FIG. 2 is a front view thereof as seen from the line II—II.

Referring to FIGS. 1 and 2, a working line 1 is shown along which a driving shaft A held on a conveying jig 2 is conveyed. Between a charging station 3 at the starting end of the working line 1 and a discharging station 4 at the final end of the working line 1 are provided first to fourth working stations $5_1$, $5_2$, $5_3$ and $5_4$. The driving shaft A being brought over by a conveyor 6 from an assembling device (not shown) is transferred by a carry-in device 7 onto the conveying jig 2 standing in the charging station 3. Using a transfer device 8, the conveying jig 2 is then conveyed to each of the working stations $5_1$, $5_2$, $5_3$, $5_4$ successively in that order. Fastening operations to fasten securely in place the diametrically larger end of the boot C2 for second joint B2 is performed at the first working station $5_1$. Fastening operations to fasten securely in place the diametrically smaller end of each of the boot C2 for the second joint B2 and the other boot C1 for the first joint B1 are performed at the second working station $5_2$. Fastening operations to fasten securely in place the diametrically larger end of the boot C1 for the first joint B1 is performed at the third working station 53. Fastening operations to fasten the damper weight D securely in place is performed at the fourth working station 54. Thereafter, at the discharging station 4, a discharging device 9 is operated to remove the driving shaft A from the conveying jig 2 and discharge it onto a discharging conveyor 10 while the conveying jig 2 so emptied of the shaft A is returned to the charging station 3 through a return conveyor 11.

Figure 4:
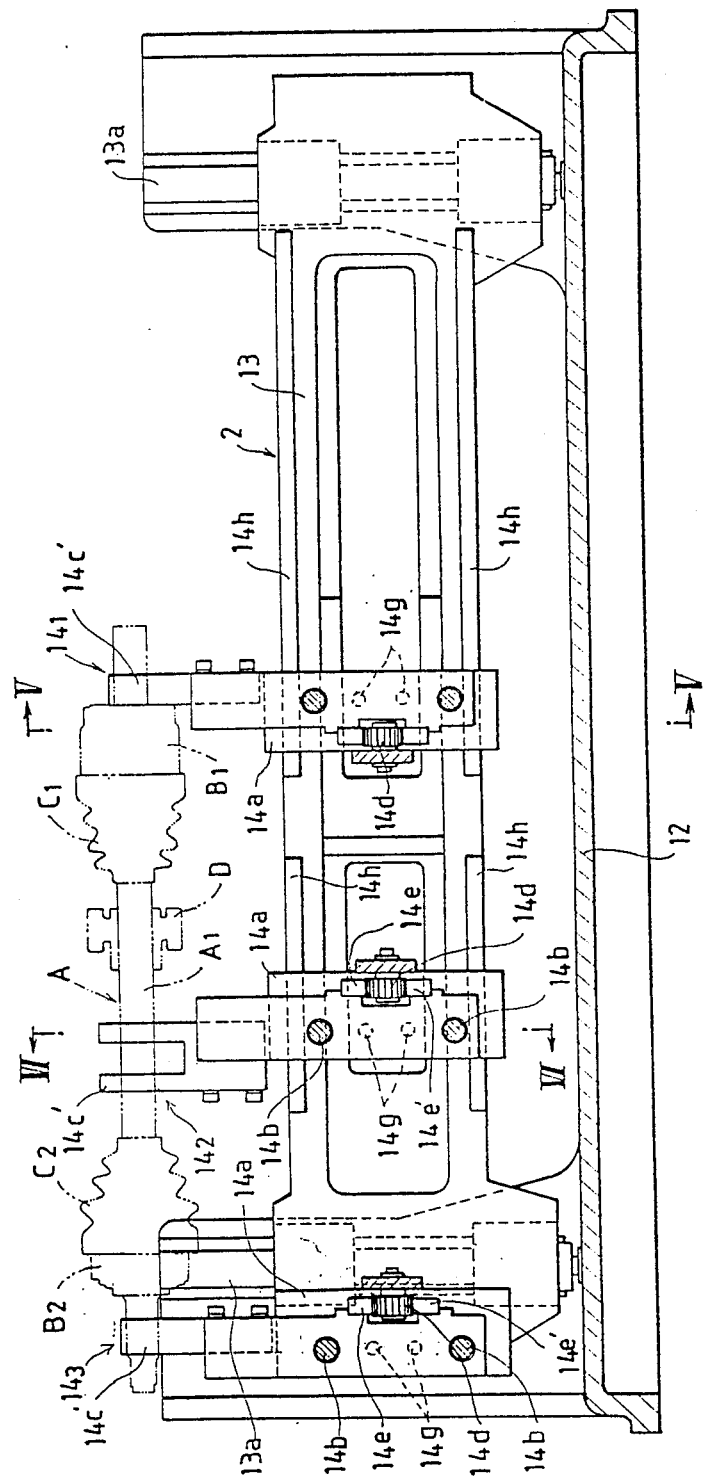
FIG. 4 is a sectional front view taken along the line IV—IV in FIG. 3.
Figure 5:
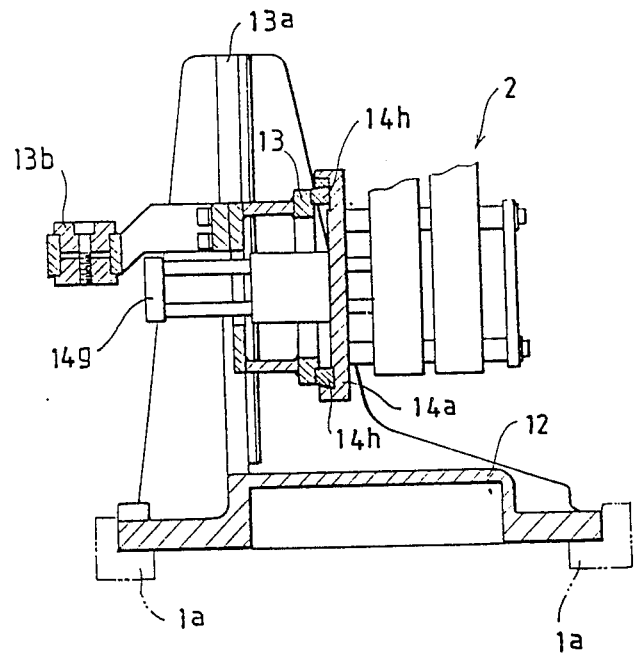
FIG. 5 is a sectional view taken along the line V—V in FIG. 4.
Figure 6:
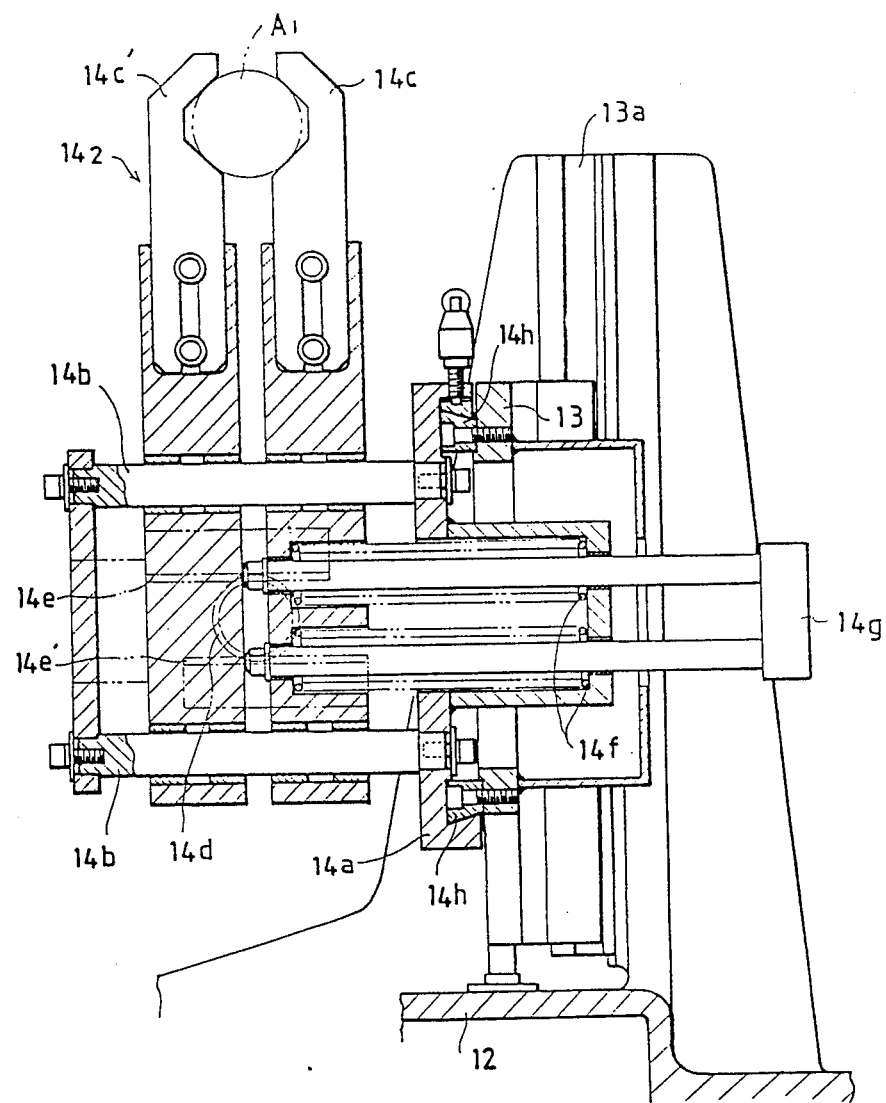
FIG. 6 is an enlarged sectional view taken along the line VI—VI in FIG. 4.

As shown in FIGS. 3 through 5, the conveying jig 2 comprises: a jig body 12 which is slidable along guide rails 1a, 1a laid on both sides of the working line 1; a jig frame 13 extending longitudinally and supported on a pair of front and rear guide rails 13a, 13a fixed to the jig body 12 so as to be movable upward and downward therealong; and a first clamper $14_1$ for clamping a shank portion of the first joint B1, a second clamper $14_2$ for clamping the shaft body A1, and a third clamper $14_3$ for clamping a shank portion of the second joint B2, all of these clampers being mounted on the jig frame 13. As shown in FIG. 6, each of the clampers $14_1$, $14_2$ and $14_3$ is so arranged that a pair of left and right clamp claws 14c, 14c are laterally slidably supported through a pair of upper and lower guide bars 14b, 14b on a holder 14a provided on the jig frame 13. A pair of upper and lower racks 14e, 14e' engaging with a pinion 14d pivotally supported on the holder 14a are respectively connected to both of the clamp claws 14c, 14c' so as to cause both the clamp claws 14c, 14c' to move laterally in a mutually synchronized fashion to open and close.

One of the clamp claws 14c is urged by a spring 14f toward the closing side so as to keep each of the clampers $14_1$, $14_2$ and $14_3$ normally held in the clamped position while there is provided on the holder 14a a push member 14g which pushes the other clamp claw 14c' toward the opening side. In addition, the charging station 3 and the discharging station 4 are each provided with an operating device 15 comprising a longitudinally extending push plate 15a which faces the push member 14g of each of the clampers $14_1$, $14_2$ and $14_3$ and is arranged so as to be movable back and forth in the lateral direction, so that each push member 14g may be pushed in by the push plate 15a for operation to unclamp each of the clampers $14_1$, $14_2$ and $14_3$ and is arranged so as to be movable back and forth in the lateral direction, so that each push member 14g may be pushed in by the push plate 15a for operation to unclamp each of the clampers $14_1$, $14_2$ and $14_3$.

Furthermore, in order to be able to handle driving shafts A of different lengths, the first and the second clampers $14_1$ and $14_2$ are mounted in such a manner that they may be moved longitudinally along a guide rail 14h for positional adjustment with respect to the jig frame 13.

A pair of positioning blocks 12a are fixedly attached to the jig body 12. An operating arm 13b is fixedly attached to the jig frame 13 for lift operation.

Figure 7:
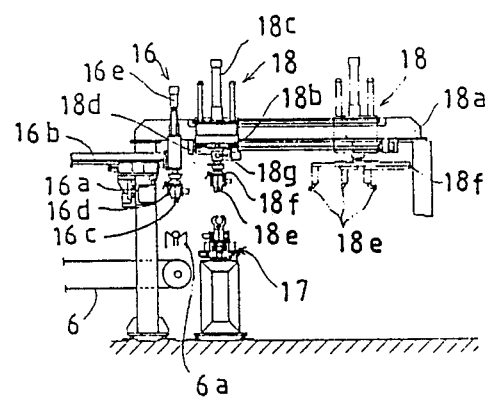
FIG. 7 is a side view of a carry-in device as seen from the line VII—VII in FIG. 1.

As shown in FIGS. 1 and 7, the carry-in device 7 comprises a first loader device 16 for receiving the driving shaft A from a work receiver 6a provided at the final end portion of the conveyor 6, a position alignment device 17 disposed between the conveyor 6 and the charging station 3, and a second loader device 18 for delivering the driving shaft A to the conveying jig 2. The first loader device 16 is arranged to comprise a machine frame 16a disposed above the final end portion of the conveyor 6, a slide frame 16b mounted on the machine frame 16a so as to be movable back and forth, three clampers 16c for clamping the driving shaft A detachably at the shank portions of the first and the second joints B1 and B2 and at the shaft body A1, and clamping head 16d extending lengthwise in the lateral direction and having the three clampers 16c thereon, with the clamping head 16d mounted on the slide frame 16b in such a manner as to be moved upwards and downwards by a cylinder 16e. In the above arrangement, the clamping head 16d is caused to receive the driving shaft A from the work receiver 6a while the slide frame 16b is in its retreated state. Then, by movement of the slide frame 16b, the clamping head 16d is moved forward and downward to transfer the driving shaft A to the position alignment device 17. Further, the second load device 18 is arranged to comprise a machine frame 18a extending longitudinally from a location above the position alignment device 17 to a location above the charging station 3, a slide frame 18b supported on the machine frame 18a so as to be movable back and forth, a lift frame 18d mounted on the slide frame 18b through a cylinder 18c, and clamping head 18f equipped with three clampers 18e as is the foregoing clamping head 16d and hung from the lift frame 18d through a rotary actuator 18g so as to be turnable. In this arrangement, after turning the clamping head 18f to a sidewise-facing posture in which its lengthwise direction is in line with the lateral direction the clamping head 18f is caused to receive the driving shaft A on the position alignment device 17 and then turned to a longitudinally-facing posture so as to have the first joint B1 of the driving shaft A positioned in front. In this condition, the clamping head 18f is moved to a location right above the charging station 3 and then moved downward so as to set the driving shaft A on the conveying jig 2 being returned to the charging station through the return conveyor 11. It should be noted here that the clampers 16c or 18e of each of the loaders 16 and 18 are so mounted as to be adjustable in position in order to be able to deal with different types of the shaft.

Figure 9:
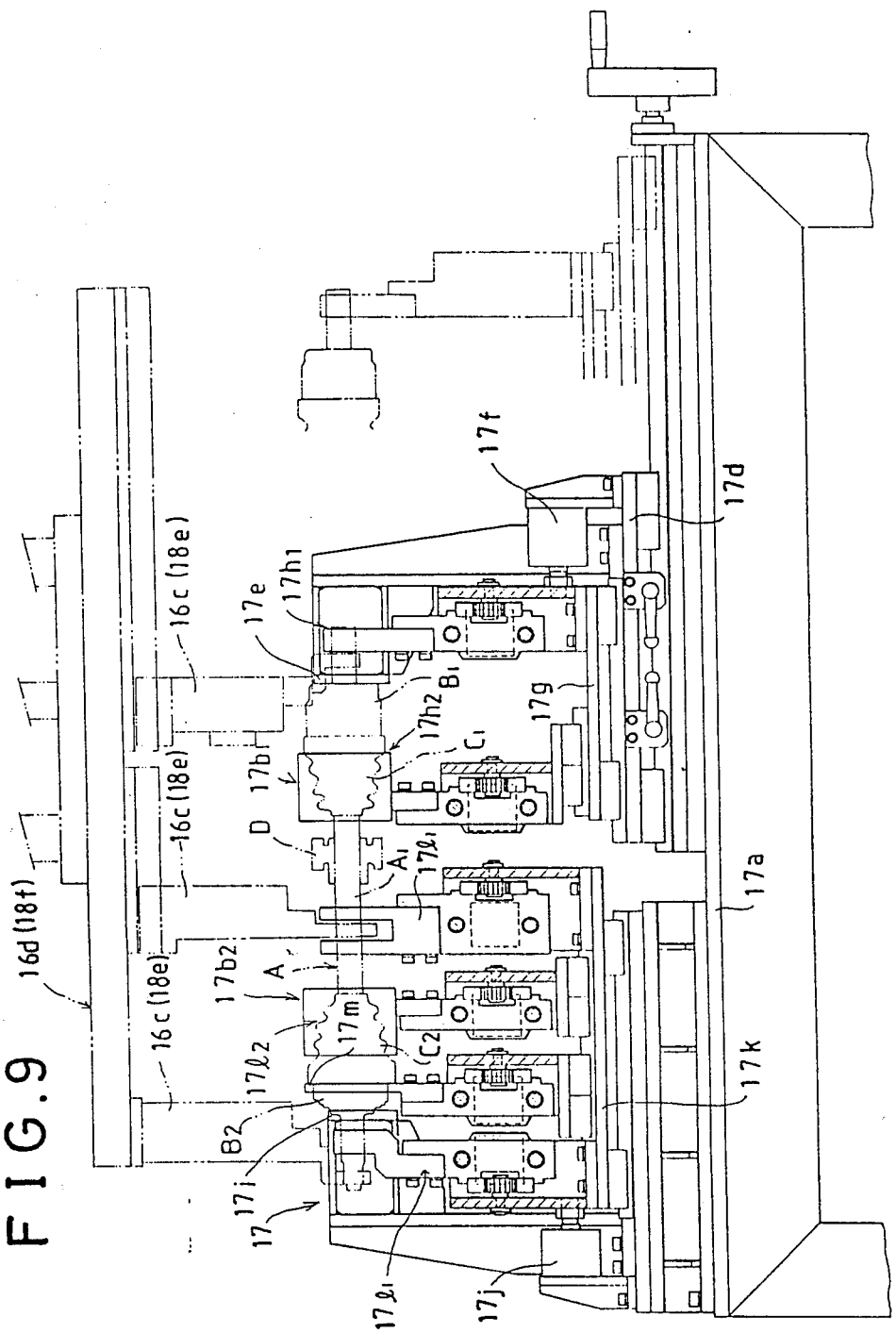
FIG. 9 is a front view thereof.
Figure 10:
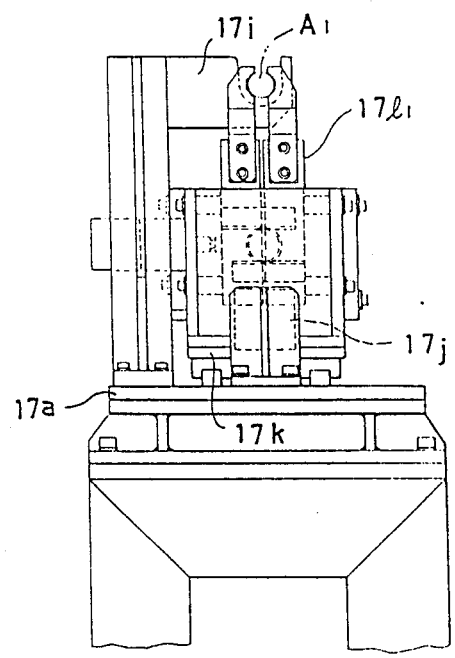
FIG. 10 is a left side view of that shown in FIG. 8.

The foregoing position alignment device 17 is, as shown in FIGS. 8 through 10, arranged to comprise a first unit $17b_1$ for positioning the first joint B1 and the boot C1 and a second unit $17b_2$ for positioning the second joint B2 and the boot C2, both units being mounted on a machine frame 17a. Thus, the diametrically smaller and larger ends of each of the boots C1 and C2 are correctly fitted over the joints B1 and B2 and the driving shaft body A2 respectively by these units $17b_1$ and $17b_2$ and at the same time each of the joints B1 and B2 is positioned thereby. In this manner, it functions to provide position alignments for the diametrically smaller and larger ends of each of the boots C1 and C2.

In order to be able to deal with possible model changes of the shaft, the foregoing first unit $17b_1$ is arranged to comprise a base plate 17d mounted on the machine frame 17a in such a manner as to be advanced and retreated for position adjustment by operation of a control bolt 17c having a handle, a stopper 17e fixedly mounted on the base plate 17d to receive the end surface of the first joint B1, a slide table 17g mounted on the base plate 17d so as to be advanced and retracted by a cylinder 17f, a first clamper $17h_1$ mounted securely on the table for clamping the shank portion of the first joint B1, and a second clamper $17h_2$ also mounted on the table 17g for clamping the boot C1, with the second clamper being movable back and forth by means of a driving source (not shown). Furthermore, the foregoing second unit $17b_2$ is arranged to comprise a stopper 17i for receiving the end surface of the second joint B2, the stopper being fixedly mounted on the machine frame 17a, a slide table 17k mounted on the machine frame 17a and moved back and forth by a cylinder 17j, a pair of first clampers 17l, $17l_1$ fixedly mounted on the slide table 17k and used for clamping the shank portion of the joint B2 and the shaft body A1, and a second clamper $17l_2$ for clamping the boot C2 being mounted on the slide table 17k in such a manner as to be moved back and forth by a driving source (not shown). In this arrangement, each of the driving shafts A brought in by the first loader device 16 is clamped at the shank portion of each of the joints B1 and B2 and the shaft body A thereof by the first clampers $17h_1$ and $17l_1$ of both units $17b_1$ and $17b_2$ and then the slide tables 17g and 17k of the respective units $17b_1$ and $17b_2$ are moved outwardly along the axial line of the driving shaft A so as to have each of the joints B1 and B2 properly positioned by bringing the end surfaces of the joints B1 and B2 to abut against the stoppers 17e and 17i respectively. Next, the boots C1 and C2 are clamped respectively with the second clampers $17h_2$ and $17l_2$ of the respective units $17b_1$ and $17b_2$ and then each of the second clampers $17h_2$ and $17l_2$ is moved outwardly along the axial line, so that a stepped portion Ca on the inner periphery of the diametrically larger end portion of each of the boots C1 and C2 may hit the open end of each of the joints B1 and B2 so as to position each of the boots C1 and C2 with respect thereto.

Since the open end of the second joint B2 is somewhat round-shaped, the stepped portion Ca of the boot C2 being fitted over the second joint B2 is pushed sometimes too far along the outer peripheral portion of the second joint B2 as the boot C2 is pushed by push-in force of the second clamper $17l_2$. In order to avoid such from occurring, an embodiment of the present invention shown in the drawings has a boot stopper $17m$ provided on the slide table $17k$ so as to receive and stop the leading end surface of the diametrically larger end of the joint B2, the stopper $17m$ being so designed as to be opened and closed as desired.

As described in the foregoing, the driving shaft A can be positionally adjusted so that it may be accurately positioned and set on the conveying jig 2 through the second loader device 18 so as to have each of the boots C1 and C2 disposed at the predetermined positions with respect thereto.

Each of the foregoing working stations $5_1$ through $5_4$ is provided with a band-winding device. Namely, the first working station $5_1$ is provided with a first band winding device $19_1$ suitable for band winding on the diametrically larger end portion of the boot C2 for the second joint B2; the second working station $5_2$ is provided with two units of the band winding device including a second band winding device $19_2$ suitable for the diametrically smaller end of the boot C2 for the second joint B2 and a third band winding device $19_3$ suitable for the diametrically smaller end of the boot C1 for the first joint B1; the third working station $5_3$ is provided with a fourth band winding device $19_4$ suitable for the diametrically larger end of the boot C1 for the first joint B1; and the fourth working station $5_4$ is provided with a fifth band winding device $19_5$ suitable for the damper weight D. In addition, each of the working stations $5_1$ through $5_4$ is provided with a positioning device 20 for positioning the conveying jig 2 and then lifting up the driving shaft A to a predetermined position, so that a band E winding operation is performed by means of each band winding device while the driving shaft A is held lifted up.

Figures 11A, 11B:
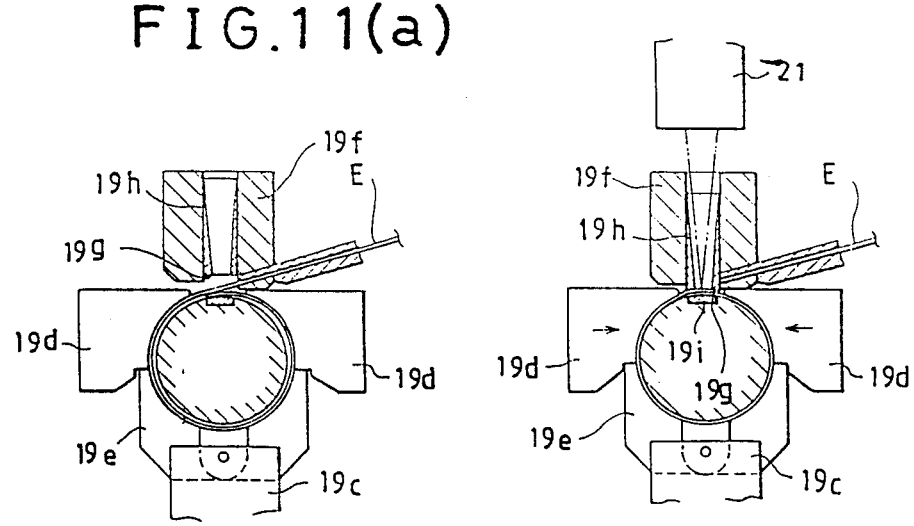
FIGS. 11a and 11b are each an explanatory diagram illustrating operation of a band winding device.

Each band winding device, as shown in FIG. 2, is provided with a winding head $19b$ for supplying a band E being drawn out from a band coil $19a$. An arm $19c$ pivotally supported on the winding head $19b$ is swung upwards from an escape position below after the driving shaft A has been lifted up so that the portion to be wound therearound with the band E may be surrounded by a pair of left and right guide pieces $19d$, $19d$ provided on the winding head $19b$ and another guide piece $19e$ attached to the arm $19c$ in such a manner as to leave a clearance therebetween as shown in FIG. 11a. The band E is then fed in through this clearance to be wound for a little over one round around the outer periphery of the portion to be wound therearound with the band E. The band E is then tightened in place by these guide pieces $19d$ and $19e$ while a pressor member $9h$ provided with a cutting edge $19g$ and inserted in a guide sleeve $19f$ is moved downward for cutting the band E. After cutting the band E as above, the overlapped portion of both ends of the band E is irradiated with laser beams emitted from a laser irradiation head 21 which will be discussed later, the laser beams being applied to the overlapped portion through an irradiation hole formed in the pressor member $9h$, thereby welding the band e. A back bar $91i$ is mounted on the winding head $19b$ so as to be movable back and forth along the axial line of the shaft A and support the overlapped portion thereof from inside.

The foregoing arrangement of the band winding device is not particularly different from that disclosed in the Japanese Unexamined Utility Model Registration Application No. Jikkaisho 58-146630, so that any further detailed description thereof is omitted.

In this embodiment of the present invention, the second through the fifth band winding devices, $19_2$ to $19_5$, are arranged to be moved back and forth through the control bolt $19k$ by each of the motors $19j$ as shown in FIG. 1 so that their positions may be changed according to the type of the shaft A.

Figure 12:
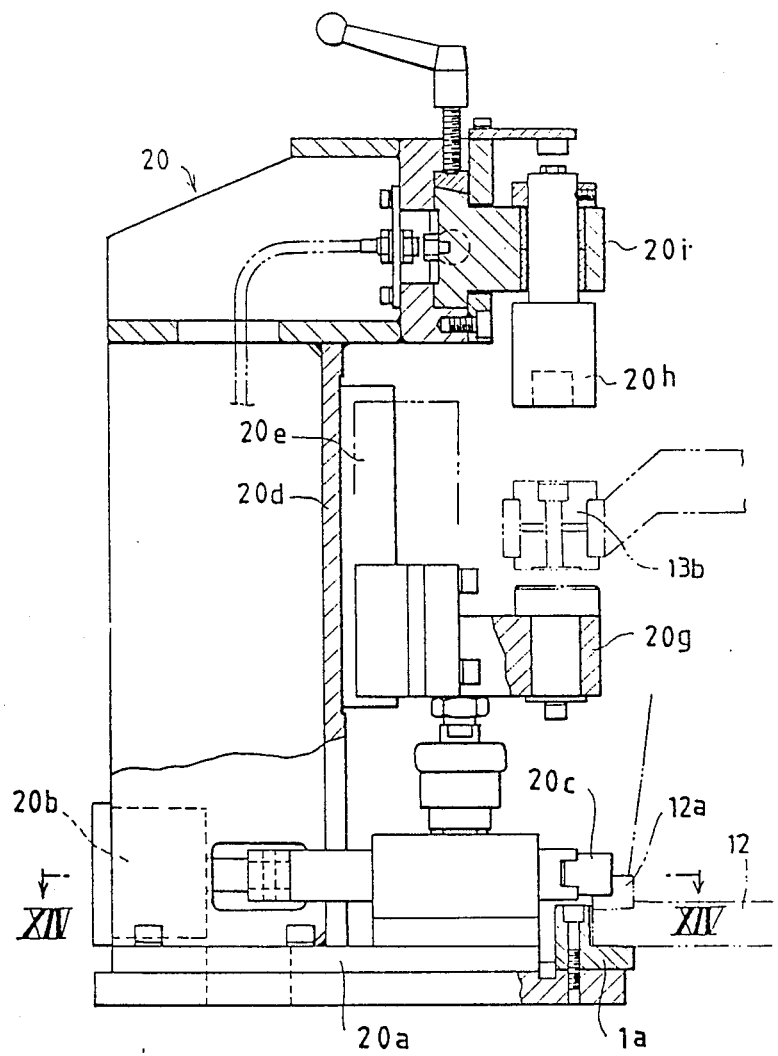
FIG. 12 is a front view of a positioning device provided at a working station.
Figure 14:
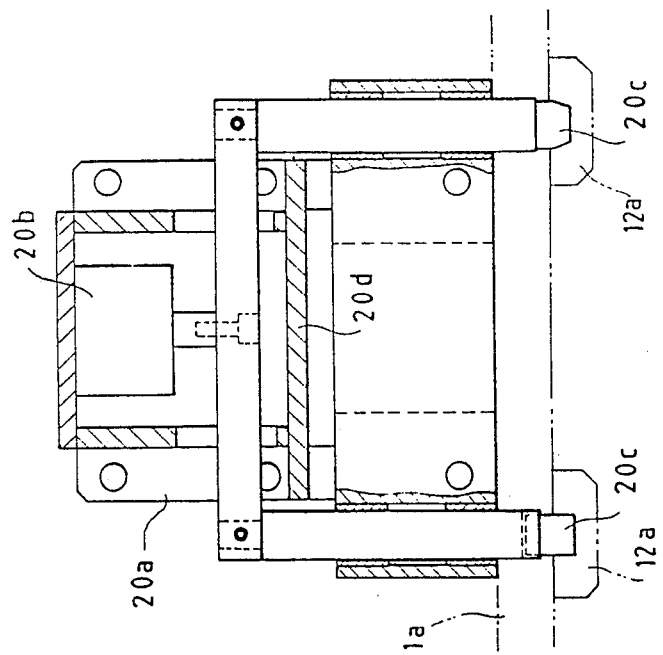
FIG. 14 is a sectional top plan view taken along the line XIV-XIV in FIG. 12.
Figure 13:
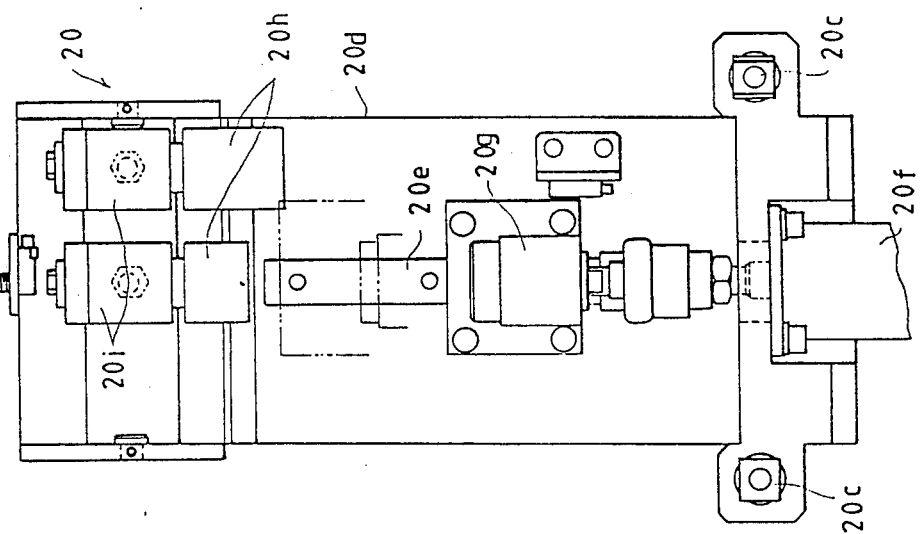
FIG. 13 is a left side view of that shown in FIG. 12.

The foregoing positioning device 20 is, as shown in FIGS. 12 through 14, arranged to comprise: a machine base $20a$ disposed outside of the guide rail $1a$ on one side of the working line 1; a pair of positioning pins $20c$, $20c$ mounted on the machine base $20a$ in such a manner as to be movable back and forth in the lateral direction by a cylinder $20b$; a lifter $20g$ so mounted as to be moved upward and downward by a cylinder $20f$ along a guide rail $20e$ securely attached to a support column $20d$ erected on the machine frame $20a$; and a stopper $20h$ attached to the upper end of the support column $20d$. In this arrangement, each of the positioning pins $20c$ is advanced inwardly in the lateral direction to be engaged with each positioning block $12a$ securely mounted on the jig body 12 of the conveying jig 2, thereby positioning the conveying jig 2. Next, the lifter $20g$ is moved upward to push up the jig frame 13 of the conveying jig 2 through the operating arm $13b$ until the arm $13b$ comes to abut against the stopper $20h$, so that the driving shaft A supported on the jig frame 13 through the clampers $14_1$, $14_2$ and $14_3$ is lifted up to the predetermined position.

When the shaft diameter and/or joint diameter of a driving shaft are changed due to change in type thereof, it is necessary to change the liftup position of the driving shaft A in accordance with the change. To meet his need, according to the present embodiment of this invention, two stoppers $20h$, $20h$ which are different in height from each other are mounted on a slider $20i$ attached to the upper end of the support column $20d$ so that the stoppers $20h$, $20h$ may be selectively moved to and set at their operating positions matching the position of the lifter $20g$.

Furthermore, there are provided on the working line 1, two laser beam irradiation heads, a first irradiation head $21_1$ and a second irradiation head $21_2$, both of which are movable back and forth. They are described more in detail as follows:

There is provided above the working line 1 a machine frame 22 longitudinally extending over the first working station $5_1$ to the fourth working station $5_4$. As shown in FIGS. 15 and 16, each supporting plate $21a$ carrying one of the laser beam irradiation heads $21_1$, $21_2$ is supported on the machine frame 22 in such a manner that it may be longitudinally slidable along a pair of upper and lower guide rails $22a$, $22a$. On each supporting plate $21a$ is mounted a motor $21c$ for rotating a pinion $21b$ which engages with a rack 22b fixedly attached to the machine frame 22. Thus, each supporting plate 21a, that is, each of the laser beam irradiation heads $21_1$, $21_2$ is moved back and forth independently of each other by its motor 21c.

In addition, the first laser beam irradiation head $21_1$ is arranged to be movable to a position at which it is aligned with one of the first and the second band winding devices $19_1$, $19_2$ while the second laser beam irradiation head $21_2$ is arranged to be movable to a position at which it is aligned with one of the third through the fifth band winding devices $19_3$, $19_4$, $19_5$, so that the two irradiation heads $21_1$, $21_2$ can take care of welding the overlapped portions of the band E wound up by the five band winding devices $19_1$ through $19_2$ according to the above-described allotment of the welding work.

The machine frame 22 is provided at its leading or front end with a mirror box 25 for connecting a light-guide path 24 which is communicated with a laser beam generator 23. Mirror boxes $26_1$, $26_2$ are also attached respectively to the upper ends of the laser beam irradiation heads $21_1$, $21_2$. These mirror boxes 25, $26_1$ and $26_2$ are connected in series to one another through a bellows-like light guide tube 27. Additionally, a moving mirror 26a is housed in the mirror box $26_2$ attached to the upper end of the second laser beam irradiation head $21_2$ which is movable to a reflection position at which it reflects the laser beam downward toward the irradiation head $21_2$ and to an open position at which it allows the laser beam to advance rectilinearly toward the first laser beam irradiation head $21_1$, so that the mirror 26a is reversed or changed in position to selectively lead the laser beam into either one of the laser beam irradiation heads $21_1$, $21_2$.

Now, operation of this embodiment of the present invention will be explained in the following:

When the conveying jigs 2 are conveyed to each of the working stations $5_1$ through $5_4$, the conveying jigs are first positioned by the positioning devices 20 and the driving shafts A are lifted up to the predetermined position. Next, using each of the band winding devices $19_1$ through $19_5$, the band E is wound around the predetermined portions and then cut. More specifically, the first band winding device $19_1$ is used to wind up a band E around the diametrically larger end portion of the boot C2 for the driving shaft positioned in the first working station $5_1$, the second and the third band winding devices $19_2$, $19_3$ are used to wind a band E around each of the diametrically smaller end portions of the boots C2 and C1 for the driving shaft A positioned in the second working station $5_2$, the fourth band winding device $19_4$ is used to wind a band E around the diametrically larger end portion of the boot C1 for the driving shaft A positioned in the third working station $5_3$, and the fifth band winding device $19_5$ is used to wind up a band E around the damper weight D fitted over the driving shaft A positioned in the fourth working station $5_4$.

While the foregoing operation is going on, the first laser beam irradiation head $21_1$ and the second laser beam irradiation head $21_2$ remain on standby at the respective positions, one aligned with the first band winding device $19_1$ and the other aligned with the third band winding device $19_3$. After the foregoing band winding operations are over, the laser beam is first led into the second laser beam irradiation head $21_2$ so as to weld the band E wound up around the diametrically smaller end portion of the boot C1 by the third band winding device $19_3$. Next, the second laser beam irradiation head $21_2$ is moved to a position at which it is aligned with the fourth band winding device $19_4$ and at the same time the laser beam is led into the first laser beam irradiation head $21_1$ so as to weld the band E wound around the diametrically larger end portion of the boot C2 by the first band winding device $19_1$. Then, the first laser beam irradiation head $21_1$ is moved to a position at which it is aligned with the second band winding device $19_2$ and at the same time the laser beam is led into the second laser beam irradiation head $21_2$ so as to weld the band E wound around the diametrically larger end portion of the boot C1 by the fourth band winding device $19_4$. Thereafter, the second laser beam irradiation head $21_2$ is moved to a position at which it is aligned with the fifth band winding device $19_5$ and at the same time the laser beam is led into the first laser beam irradiation head $21_1$ so as to weld the band E wound around the diametrically smaller end portion of the boot C2 by the second band winding device $19_2$. Finally, the laser beam is led into the second laser beam irradiation head $21_2$ so as to weld the band E wound around the damper weight D by the fifth band winding device $19_5$.

After the welding process has been completed as described in the foregoing, each driving shaft A is moved downward and each conveying jig 2 is conveyed respectively to next station, thereby completing one cycle of the operation.

In the foregoing, description is made of an embodiment of the present invention in which there is provided only one working line 1. However, as shown in FIGS. 17 and 18, there can be provided two units of the working line 1 disposed in parallel to each other in mirror symmetry, wherein the first loader device 16, the position alignment device 17 and the second loader 18 which combine to make up the carry-in device 7 are provided each in a pair, one for each of the tow working lines 1. The driving shafts A are then brought in alternately to the two working lines 1, so that while the preparatory process including the band E winding operation is being performed in one of the two working lines 1, the welding operation can be carried out in the other of the two working lines 1.

Each position alignment device 17 and each second loader device 18 are constructed the same as those in the foregoing first embodiment while each first loader device 16 in this embodiment consists of the first loader device of the foregoing first embodiment arranged to be mounted on each moving frame 16f in such a manner that it may be movable back and forth with its slide frame 16b in the longitudinal direction, each moving frame 16f being supported laterally slidably, as shown in FIG. 19, on the machine frame 16a so laid as to extend laterally over the final end portion of the conveyor 6. In this arrangement, the moving frames 16f, 16f of both the first loader devices 16, 16 are connected to each other through a connecting rod 16g so that, by means of a single shift cylinder 16h connected to one of the moving frames 16f, both the first loader devices 16, 16 may be moved alternately to the central receiving position facing toward above the conveyor 6 and the delivery position at the side facing toward each of the position alignment devices 17. The driving shaft A is received by each first loader device 16 at the delivery position. The driving shaft A positionally aligned by the position alignment device 17 as in case of the foregoing first embodiment is then set on the conveying jig 2 standing in the charging station 3 of each working line 1, using each second loader device 18 for such setting.

In this second embodiment of the present invention, the front end of the light guide path 24 communicating with the laser generator 23 is connected to the mirror box 25 located at the lead-in end of one of the two working lines 1 while the mirror box 25 for the lead-in end of the other of the tow working lines 1 is connected to a branched portion 24a provided at the mid-way point of the light guide path 24. A reversible mirror 24a is housed in the branched portion 24a so that the laser beam may be selectively supplied to each of the two working lines 1, 1.

Now, the operation of this second embodiment will be explained.

After bringing in the driving shafts A by the carry-in device 7 and setting them on the conveying jigs 2 of one of the two working lines 1, the conveying operation for that one working line is done to move the conveying jigs successively to each of the working stations $5_1$ through $5_4$. Each conveying jig 2 is positioned by each corresponding positioning device 20 and the driving shaft A carried thereon is lifted up. Then, each of the band winding devices $19_1$ through $19_5$ is operated to wind a band E around each of the predetermined portions in the same manner as in case of the foregoing first embodiment. After completing the band winding, the band E is cut.

While the foregoing preparatory process is going on at the working stations of that one working line, the laser beam emitted from the laser generator 23 is supplied to the mirror box 25 located at the lead-in end of the other of the two working lines and the first and the second laser beam irradiation heads $21_1$, $21_2$ provided on that other working line 1 are alternately moved in the same manner as in case of the foregoing first embodiment so as to weld successively each of the bands E which have been wound around the predetermined portions of the driving shafts on that other working line. Furthermore, during this welding process, a driving shaft A is brought in by the carry-in device 7 and set on the conveying jig 2 standing in the charging station 3 of that other working line 1 and, after completion of the welding process, each of the conveying jigs 2 on that other working line 1 is conveyed successively to next working station to carry out the preparatory process in the same manner as described above. While this preparatory process is going on, the laser beam emitted from the laser generator 23 is supplied to the mirror box 25 for the one working line 1 in which the preparatory process has been now completed, thereby carrying out the welding process for the bands E on that one working line 1.

As described in the foregoing, the preparatory process and the welding process are repeated alternately in the two working lines 1, 1 to continuously perform the operation for securely fastening in place the boots B1, B2 and the damper weight D.

It is readily apparent that the above-described has the advantage of wide commercial utility. It should be understood that the specific form of the invention hereinabove described is intended to be representative only, as certain modifications with the scope of these teachings will be apparent to those skilled in the art.

Accordingly, reference should be made to the following claims in determining the full scope of the invention.

What is claimed is:

1. A method of fastening parts securely in place by a band comprising winding a band around each of tight-binding portions of a plurality of parts fitted over an article to which said parts are to be fastened using a band winding device and applying a laser beam emitted from a laser beam irradiation head to an overlapped portion of both ends of the band for welding thereof, said method further comprising the steps of:

conveying the article successively to a plurality of working stations, each equipped with a band winding device, and performing at each of the working stations the band-winding for each of the predetermined tight-binding portions of the parts; and dividing a plurality of band winding devices disposed at said working stations into at least two groups, one comprising those in front along the conveying direction in which the article is conveyed and the other comprising those in the rear, providing one laser beam irradiation head per group of band winding devices, moving the laser beam irradiation head provided to each group successively to each of a plurality of positions at which it is aligned with one of the band winding devices belonging to the corresponding group so as to be prepared for welding of the band, wherein said movement of one of the laser beam irradiation heads is alternated with that of the other one and, while said one laser beam irradiation head is being moved, leading a laser beam emitted from a common laser generator into the other laser beam irradiation head to carry out the welding.

2. An apparatus for fastening parts securely in place by a band having a band winding device for winding a band around each of tight-binding portions of plurality of parts fitted over an article to which said parts are to be fastened and a laser beam irradiation head applying a laser beam to the overlapped portion of both ends of the band, said apparatus comprising:

a plurality of working stations to which the article is conveyed successively;

means for successively conveying the article through the plurality of working stations;

a band winding device provided at each of said working stations, said band winding device being applicable to the corresponding predetermined tight-binding portions of the parts;

a laser beam irradiation head provided for each of two groups of the band winding devices disposed in said plurality of working stations, one of which groups comprises those disposed in front along the conveying direction in which the article is conveyed and the other of which groups comprises those in the rear, each said laser beam irradiation head being movable successively to positions at which it is aligned with each of the band winding devices belonging to the corresponding group;

a common laser generator for generation of laser beam; and shift means for selectively leading said laser beam into each of the laser beam irradiation heads.

3. A method of fastening parts securely in place by a band including conveying an article to which parts are to be fastened along a working line having a plurality of working stations, winding a band around each predetermined tight-winding portion of parts fitted over the article using a band winding device at each of the working stations and applying a laser beam emitted from a laser beam irradiation head to and welding an overlapped portion of both ends of the band;

said method further including providing two of the working lines disposed in parallel to each other, selectively supplying the laser beam emitted from a common laser generator to each of laser beam irradiation heads in the same working line, and carrying the article alternately onto each of the working lines so that while a preparatory process including the step of band winding is being performed at one of the working lines, the step of welding is carried out at the other of the working lines.

4. A method of fastening parts securely in place by a band according to claim 3, further including dividing a plurality of the band winding devices disposed at each of said working lines into at least two groups, one comprising those in front along the conveying direction in which the article is conveyed and the other comprising those in the rear, successively moving the laser beam irradiation head provided one each for said each group of the band winding devices in each of the working lines to a position at which it is aligned with each of the band winding devices belonging to the corresponding group so as to carry out welding of the band for each group, and alternating said movement of the laser beam irradiation head for said one group with that of the laser beam irradiation head for the other group, so that the laser beam from the laser generator which can be selectively supplied to each of the working lines is led into the laser irradiation head for said other group so as to carry out welding while the laser beam irradiation head for said one group is being moved.

5. An apparatus for fastening parts securely in place by a band comprising a plurality of working stations disposed in two parallel working lines along which an article to which parts are to be fastened is conveyed;

means for conveying the articles along each of the two working lines;

a band winding device provided at each of the working stations for winding a band around each predetermined tight-binding portion of parts fitted over the article;

one or more laser beam irradiation heads provided on each of the working lines for applying a laser beam to the overlapped portion of both ends of the band wound up by said band winding device so as to weld the band;

a carry-in device to carry the article alternately onto each of the two working lines;

one common laser generator for generating the laser beam; and a first shift means for selectively supplying the laser beam from the laser generator to each of the laser beam irradiation heads provided in the same working line.

6. An apparatus for fastening parts securely in place by a band according to claim 5, wherein a plurality of the band winding devices disposed at each of said working lines are divided into at least two groups, one comprising those in front along the conveying direction in which the article is conveyed and the other comprising those in the rear, said laser beam irradiation heads are provided one per each group of each working line, said laser beam irradiation head for each group being moved successively to a position at which it is aligned with each of the band winding devices belonging to the corresponding group; and said apparatus further comprising a second shift means for selectively supplying to these laser beam irradiation heads of each working line the laser beam supplied from the laser generator to each of the working lines through the first shift means.

* * * * *